(12) United States Patent
Ferrill et al.

(10) Patent No.: US 6,443,402 B1
(45) Date of Patent: Sep. 3, 2002

(54) CABLE HANGER

(75) Inventors: Jess Britton Ferrill, Madison; W. Joe Mills, Troutman; Jerry Douglas Morgan, China Grove, all of NC (US)

(73) Assignee: CommScope Properties, LLC, Sparks, NV (US)

( * ) Notice: Subject to any disclaimer, the term of this patent is extended or adjusted under 35 U.S.C. 154(b) by 0 days.

(21) Appl. No.: 09/728,151

(22) Filed: Dec. 1, 2000

(51) Int. Cl.$^7$ .................................................. F16L 3/08
(52) U.S. Cl. ........................................................ 248/65
(58) Field of Search ................................ 248/71, 65, 72, 248/74.2, 73, 49

(56) References Cited

U.S. PATENT DOCUMENTS

| | | |
|---|---|---|
| 2,065,843 A | 12/1936 | Uum |
| 2,351,858 A | 6/1944 | Ingalls |
| 3,633,250 A | 1/1972 | Romney |
| 3,913,187 A | 10/1975 | Okuda |
| 4,334,659 A | 6/1982 | Yuda |
| 4,564,163 A | 1/1986 | Barnett |
| 4,572,466 A | 2/1986 | Yamaguchi et al. |
| 4,609,171 A | 9/1986 | Matsui |
| 4,654,612 A | 3/1987 | Smith |
| 4,669,688 A | 6/1987 | Itoh et al. |
| 4,763,132 A | 8/1988 | Juds et al. |
| 4,795,116 A | 1/1989 | Kohut et al. |
| 4,813,639 A | 3/1989 | Midkiff et al. |
| 4,840,345 A | 6/1989 | Neil et al. |
| 4,958,792 A | 9/1990 | Rinderer |
| 5,020,749 A | 6/1991 | Kraus |
| 5,161,759 A | 11/1992 | Burns et al. |
| 5,393,021 A | 2/1995 | Nelson |
| 5,568,906 A | 10/1996 | Hahn et al. |
| 5,799,906 A | 9/1998 | Hillegonds |
| 5,906,342 A | 5/1999 | Kraus |
| 5,967,468 A | 10/1999 | Veghte et al. |
| 6,161,804 A * | 12/2000 | Paske et al. ............... 248/74.1 |
| 6,257,530 B1 * | 7/2001 | Tsai ........................... 248/74.2 |

OTHER PUBLICATIONS

Cell Reach Product Catalog, CommScope, Inc. 1999, p. 20.
6 Photographs of a cable hanger—date unknown.

* cited by examiner

Primary Examiner—Ramon O. Ramirez
(74) Attorney, Agent, or Firm—Alston & Bird LLP

(57) ABSTRACT

A hanger for mounting a cable to a support structure includes a flexible resilient unitary metallic strip. The strip has a medial portion shaped in a generally circular configuration about a longitudinal axis to form a cable holding section defining a longitudinally extending passageway for receiving and at least partially surrounding the cable. The strip has attachment legs extending from opposite ends of the medial portion in opposing spaced apart relation to one another generally perpendicular to the longitudinal axis. The attachment legs are configured for being inserted into an installation opening. The cable holding section includes a first circumferentially extending slot extending at least partially around the circumferential extent of the passageway, and a pair of second circumferentially extending slots formed in the cable holding section on opposite sides of the first slot. The first slot and the pair of second slots define in the cable holding section along opposite sides of the first slot a pair of torsion springs extending at least partially around the passageway and capable of torsional deflection, a pair of bands adjacent the second slots, and at least one cantilevered gripping tab projecting from each torsion spring laterally into the adjoining second slot and oriented for grippingly engaging the surface of a cable placed in the passageway. The bands extend circumferentially at least partially around the passageway. A gripping protrusion is formed in each gripping tab and faces inwardly toward the passageway for gripping the surface of a cable placed in the passageway.

16 Claims, 4 Drawing Sheets

CABLE HANGER

FIELD OF THE INVENTION

The present invention relates generally to a cable hanger and, more particularly, to a cable hanger including a flexible metallic strip, with the metallic strip having attachment legs formed at opposite ends thereof for being inserted into an installation opening of a support structure, and a medial portion between the attachment legs for releasably holding a section of cable.

BACKGROUND OF THE INVENTION

It is well known to use cable hangers of the above-described type to secure cables to towers. More specifically and for each cable and tower, multiple cable hangers hold the cable and are removably mounted to the tower at positions that are spaced apart along the height of the tower. It is typical for the towers to be of considerable height. Because of safety considerations as well as the time and expense involved with installing cables to towers, it is advantageous to minimize both the amount of time and the complexity of the work required for running cables up the towers. Consequently, cable hangers that can be used to easily and rapidly attach cables to towers and other types of support structures without the need for conventional hardware, such as bolts, washers, nuts or other small parts, have been developed. Examples of these cable hangers are disclosed in U.S. Pat. Nos. 4,763,132; 4,813,639; 5,393,021 and 5,967,468.

A problem with some cable hangers of the above-described type is that they do not strike an optimal balance between performance characteristics. For example, some that are capable of being sufficiently securely mounted to a support structure and capable of sufficiently securely gripping a cable are relatively difficult to install by hand.

Another problem stems from the fact that it is common for the size of installation openings of support structures and the diameters and cross-sectional shapes of cables to vary. Some cable hangers of the above-described type are disadvantageously very sensitive to these variations. For example, some cable hangers can be very difficult to install or uninstall when used with oversized or misshaped cables, and the ability of some cable hangers to hold a cable diminishes considerably when used with slightly undersized or misshaped cables.

Accordingly, there is a need for a cable hanger that can be easily attached to a support structure manually, and which will securely grip and retain a cable in position on a support structure.

Additionally, there is a need for a cable hanger having an enhanced tolerance for variations in cable size or variations in the installation openings.

SUMMARY OF THE INVENTION

In accordance with one aspect of the present invention, a cable hanger is provided which includes a flexible resilient strip. The strip preferably has attachment legs formed at opposite ends thereof configured for being inserted into an installation opening on a support structure. The strip also has a medial portion between the attachment legs and shaped to form a cable holding section defining a longitudinally extending passageway for receiving and at least partially surrounding the cable. The cable holding section includes a slot extending at least partially around the circumferential extent of the passageway. The slot defines a torsion spring in the cable holding section. The torsion spring extends along at least one side of the slot and at least partially around the passageway. The slot preferably extends around at least about one-half the circumferential extent of the passageway. At least one gripping projection projects from the torsion spring and is oriented for grippingly engaging the surface of a cable placed in the passageway so that the torsion spring is torsionally deflected. The gripping projection is preferably a cantilevered gripping tab that projects laterally into the slot.

In accordance with another aspect of the present invention, an additional slot is formed in the cable holding section and extends at least partially around the circumferential extent of the passageway. The additional slot defines an additional torsion spring in the cable holding section. The additional torsion spring extends at least partially around the passageway and is capable of torsional deflection. At least one gripping projection, which is preferably a gripping tab, projects from the additional torsion spring and is oriented for grippingly engaging the surface of a cable placed in the passageway so that the additional torsion spring is torsionally deflected.

In accordance with a further aspect of the present invention, each gripping tab includes a gripping protrusion formed therein and facing inwardly toward the passageway for gripping the surface of a cable. Preferably at least one additional gripping protrusion is formed on the cable holding section at a location spaced from the gripping tabs for gripping another portion of the surface of the cable.

Also in accordance with an aspect of the present invention, the cable holding section includes a first circumferentially extending slot formed in the cable holding section and extending at least partially around the circumferential extent of the passageway, and a pair of second circumferentially extending slots formed in the cable holding section on opposite sides of the first slot. The first slot and the pair of second slots define in the cable holding section along opposite sides of the first slot a pair of torsion springs extending at least partially around the passageway and capable of torsional deflection. For each torsion spring, at least one gripping projection projects from the torsion spring and is oriented for grippingly engaging the surface of a cable placed in the longitudinal passageway.

In accordance with one aspect of the present invention, the first slot is of substantially uniform width along its extent, and each of the second slots include respective reduced width portions defining the gripping projections so that they are in the form of cantilevered gripping tabs. Each gripping tab preferably includes a gripping protrusion formed therein and facing inwardly toward the passageway for gripping the surface of a cable.

In accordance with one aspect of the present invention, the cable holding section further includes a pair of bands adjacent the second slots. The bands extend circumferentially at least partially around the passageway.

BRIEF DESCRIPTION OF THE DRAWINGS

Figure 1:
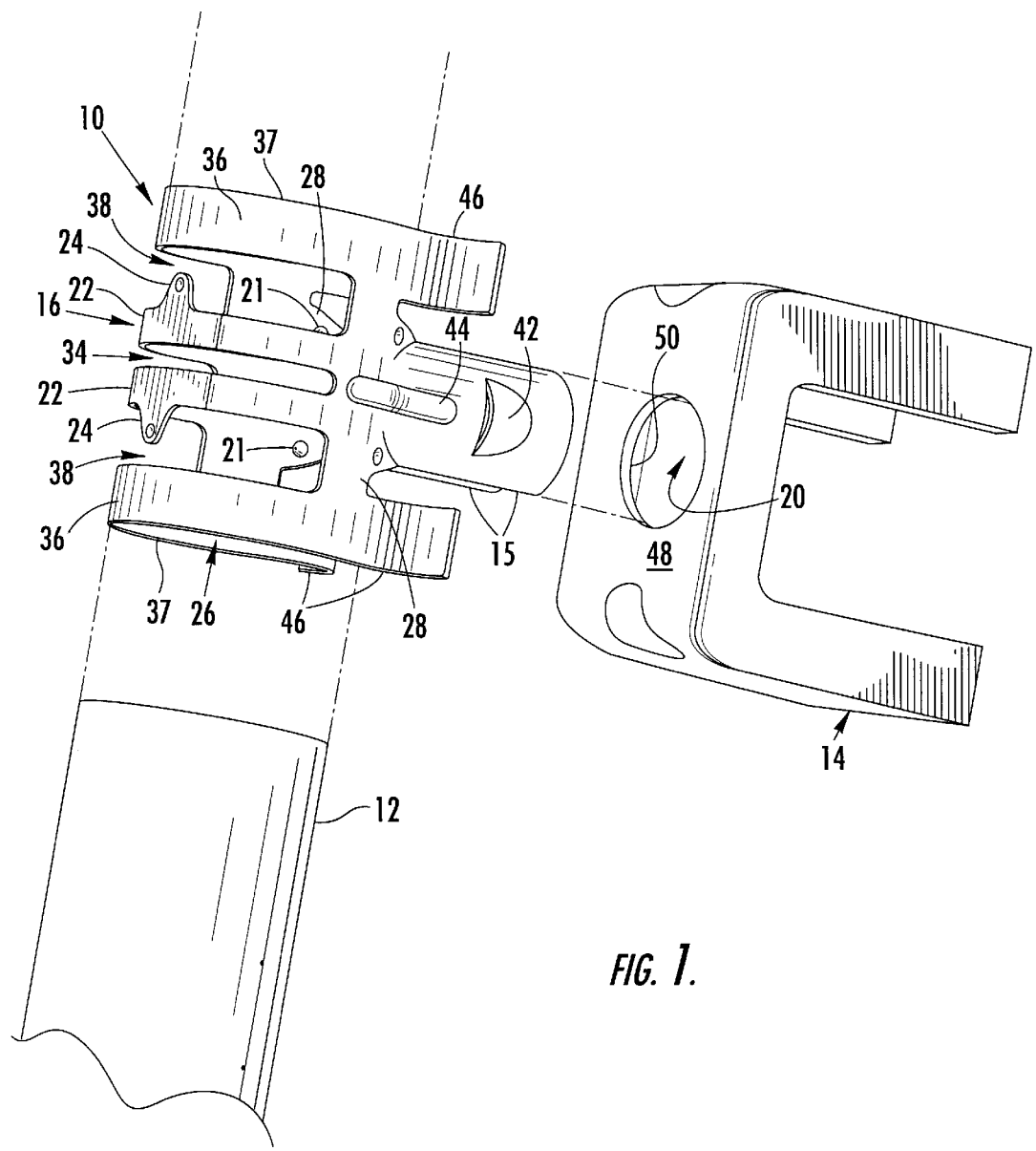
Figure 2:
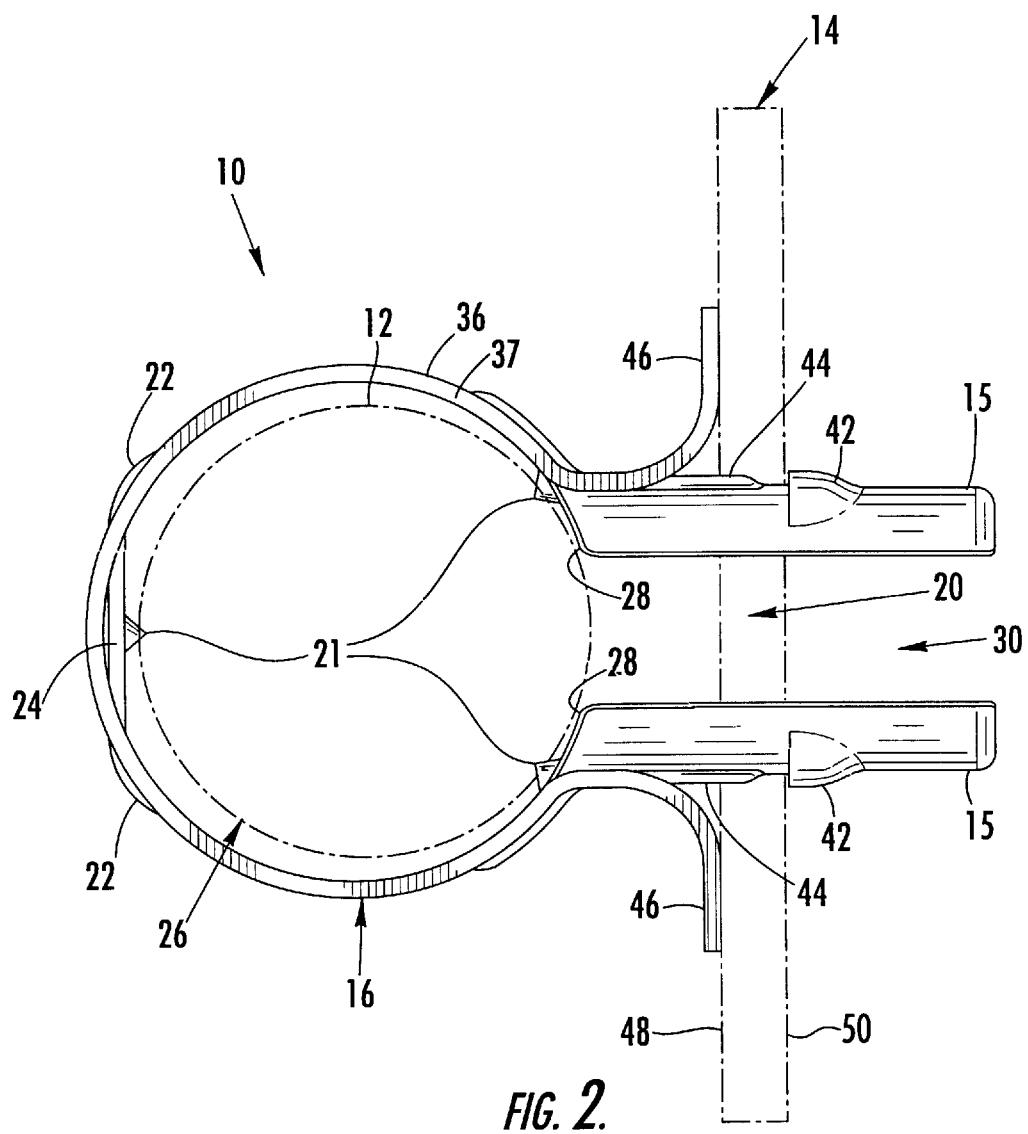
Figure 3:
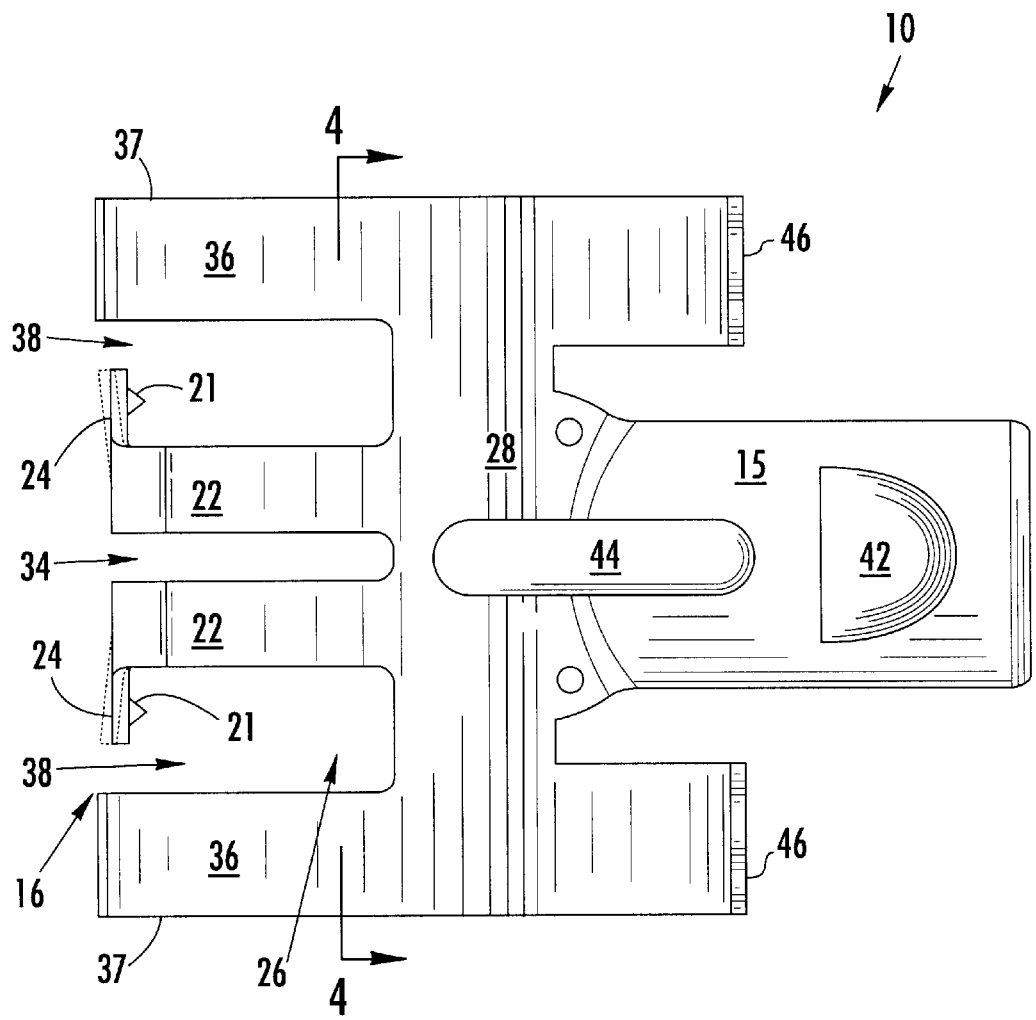
Figure 4:
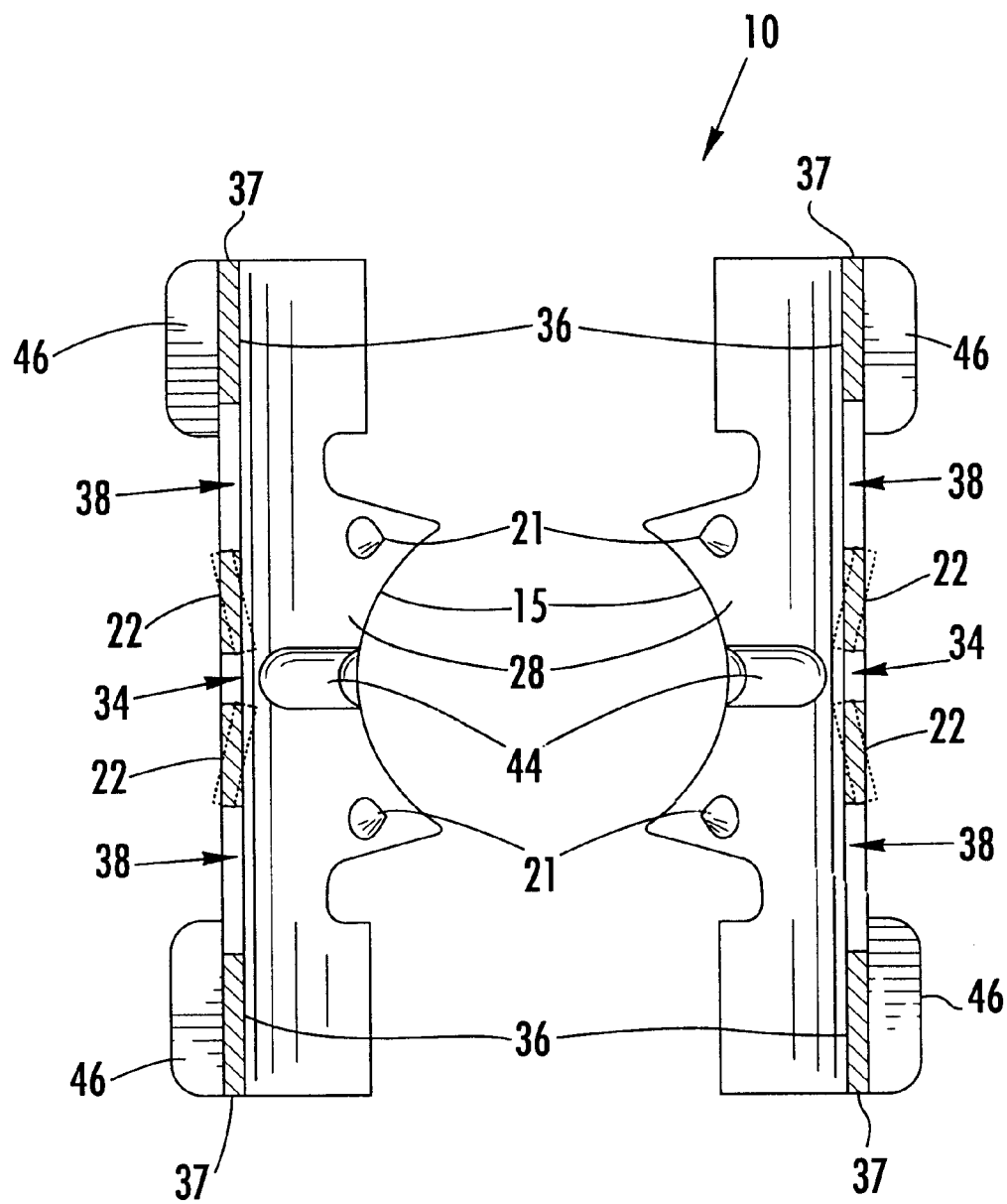

Having thus described the invention in general terms, reference will now be made to the accompanying drawings, which are not necessarily drawn to scale, and wherein:

FIG. 1 is a perspective view of a cable hanger exploded away from a section of cable and a support structure, in accordance with an exemplary embodiment of the present invention;

FIG. 2 is a top plan view of the hanger of FIG. 1 with the cable and support structure schematically illustrated, and the bottom plan view is identical to the top plan view;

FIG. 3 is partially schematic, isolated, right side elevation view of the hanger of FIG. 1, and the left side elevation view is a mirror image of the right side elevation view; and FIG. 4 is a partially schematic cross-sectional view of the hanger taken along line 4—4 of FIG. 3.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a cable hanger in accordance with an exemplary embodiment of the present invention is designated by the numeral 10, and the hanger is shown exploded away from a section of conventional cable 12 and a conventional support structure 14. In accordance with this embodiment, the hanger 10 includes a flexible resilient metallic strip. The strip preferably has attachment legs 15 formed at opposite ends thereof, and a medial portion that is between the attachment legs 15. The medial portion forms a cable holding section 16 of the hanger that is for extending around and releasably holding the section of cable 12. In FIG. 1, the pair of dashed lines that extend from the cable 12 are schematically illustrative of the cable extending through the cable holding section 16. The attachment legs 15 are for being inserted into an installation opening 20 defined by the support structure 14 to releasably connect the hanger, and the cable 12 held by the hanger, to the support structure.

As will be discussed in greater detail below and in accordance with the exemplary embodiment, the hanger 10 is configured to include one or more springs, preferably torsion springs, which provide for enhanced tolerance in dimensional variations while assuring secure fastening of the cable. The springs function, preferably in combination with gripping protrusions 21 (also see FIGS. 2–4), to assure that the hanger performs its intended function. In accordance with the exemplary embodiment, components of the cable holding section 16 function as a compound spring, including both a torsion spring element and a cantilever spring element. As will be discussed in greater detail below, intermediate bands 22 function as the torsion springs, and gripping projections (e.g., gripping tabs 24) respectively project from the intermediate bands for grippingly engaging the surface of a cable 12 held by the cable holding section 16. The gripping projections are preferably in the form of gripping tabs 24 that function as cantilever springs. Advantageously and as a result, the hanger 10 has an enhanced tolerance to inconsistencies in installation openings 20 and cables 12, can be relatively easily manually attached to the support structure 14 without requiring the use of tools, such as pliers, remains securely (but removably) attached to the support structure, and is capable of securely gripping cables. These advantages are particularly important when the hangers 10 are used, for example, to install cables 12 along tall towers (not shown), as will be discussed in greater detail below.

Referring to FIG. 1, it is noted for the purpose of providing a frame of reference, as opposed to being for purposes of limitation, that the section of cable 12 extends in a longitudinal direction through the cable holding section 16 while being held by the hanger 10. Referring also to FIG. 2, the cable holding section 16 has a generally circular configuration and extends at least partially around a longitudinal axis to define a longitudinal passageway 26. As schematically illustrated by dashed lines in FIG. 2, the cable 12 extends approximately coaxially within the longitudinal passageway 26 while being held by the cable holding section 16.

Referring to FIG. 2, the cable holding section 16 includes longitudinally extending marginal portions 28 that are spaced apart from one another in a lateral direction that is perpendicular to the longitudinal direction. A lateral opening or passageway 30 that is open to the longitudinal passageway 26 is partially defined between the marginal portions 28. Referring also to FIG. 4 and in accordance with the exemplary embodiment, each marginal portion 28 includes a pair of longitudinally spaced apart, generally cone-like, and inwardly oriented gripping protrusions 21 that function to engage and hold a cable 12 within the passageway 26, as will be discussed in greater detail below.

Referring to FIGS. 1 and 3–4 and in accordance with the exemplary embodiment, the intermediate bands 22 (i.e., torsion springs) include opposite ends that are respectively connected to the marginal portions 28. Additionally, the intermediate bands 22 extend at least partially around the circumferential extent of the longitudinal passageway 26 of the cable holding section 16 that is for receiving the cable 12. The intermediate bands 22 are spaced apart from one another in the longitudinal direction so that an intermediate slot 34 is defined between the intermediate bands. The intermediate slot 34 extends at least partially around the circumferential extent of the longitudinal passageway 26.

In accordance with the exemplary embodiment, the cable holding section 16 further includes outer bands 36 that include opposite ends that are respectively connected to the marginal portions 28. The outer bands 36 also extend at least partially around the circumferential extent of and at least partially define the longitudinal passageway 26. In accordance with the exemplary embodiment, the outer bands 36 respectively include opposite edges 37 of the cable holding section 16, and the opposite edges 37 extend at least partially around the circumferential extent of the longitudinal passageway 26 and define opposite end openings to the longitudinal passageway 26. The outer bands 36 are spaced apart from the intermediate bands 22 in the longitudinal direction so that outer slots 38 are respectively defined between the intermediate bands and the outer bands. The outer slots 38 extend at least partially around the circumferential extent of the longitudinal passageway 26. The intermediate and outer slots 34 and 38 extend between and generally parallel to the opposite edges 37 of the cable holding section 16.

In accordance with the exemplary embodiment, the intermediate and outer slots 34 and 38 each extend at least approximately one half of the way around the circumferential extent of the longitudinal passageway 26; however, other lengths are also within the scope of the present invention. The intermediate and outer slots 34 and 38 advantageously allow the intermediate bands 22 to function as torsion springs that operate independently of one another and independently of the outer bands 36, as will be discussed in greater detail below. More specifically, the intermediate and outer slots 34 and 38 define the intermediate bands 22 (i.e., torsion springs) and the outer bands 36. The intermediate slot 34 defines a substantially uniform width along its extent. In contrast, the outer slots 38 include respective reduced width portions that define the gripping tabs 24.

Referring to FIGS. 1–3, the gripping projections or gripping tabs 24 are oriented for grippingly engaging the surface of a cable 12 within the longitudinal passageway 26. The gripping tabs 24 respectively extend laterally from the intermediate bands 22 into the outer slots 38 and toward the outer bands 36. Referring to FIGS. 2–3, the gripping tabs 24 also extend at least partially inwardly into the longitudinal passageway 26. In accordance with the exemplary embodiment, the gripping tabs 24 extend into the longitudinal passageway 26 at least in part due to generally cone-like and inwardly oriented gripping protrusions 21 that are integral with the gripping tabs. In accordance with the exemplary embodiment, each gripping tab 24 includes one gripping protrusion 21. Referring to FIG. 2, the gripping protrusions 21 are in a triangular arrangement in plan views of the hanger 10.

Referring to FIG. 2, the laterally spaced apart attachment legs 15 respectively extend from the marginal portions 28 of the cable holding section 16 generally perpendicular to the longitudinal axis of the longitudinal passageway 26. The lateral passageway 30 that is partially defined between the marginal portions 28 is further partially defined between the attachment legs 15. Each of the attachment legs 15 includes an outwardly extending locking barb 42. Referring to FIG. 4, the attachment legs 15 preferably define inwardly facing concave-shapes. Referring to FIGS. 1–4, strengthening ridges 44 extend across contiguous portions of the attachment legs 15 and marginal portions 28. Resilient stabilizers 46 respectively extend from the same sides of the marginal portions 28 as the attachment legs 15. A wide variety of attachment legs 15 and stabilizers 46 are within the scope of the present invention.

Use of the hanger 10 will now be described in greater detail, in accordance with the exemplary embodiment. The hanger 10 is positioned on the cable 12 by manually passing the cable through the lateral passageway 30, so that the cable becomes positioned in and at least approximately coaxial with the longitudinal passageway 26. It is preferably necessary to manually spread the attachment legs 15 apart so that the lateral passageway 30 is sufficiently wide for the cable 12 to pass therethrough.

The hanger 10 is attached to the support structure 14 while the cable 12 is within the longitudinal passageway 26 (i.e., while the hanger 10 is holding the cable), which results in the cable being attached to and stationary with respect to the support structure. Generally described, this attachment is initiated by moving the attachment legs 15 toward one another to decrease the width of the lateral passageway 30. For example, this moving of the attachment legs 15 can preferably and advantageously be facilitated by the installer of the hanger 10 manually squeezing the attachment legs together between their thumb and forefinger (i.e., pinching the attachment legs together). Although it is preferable for the attachment legs 15 to be manually pinched together as described above and usage of the hanger 10 is described hereafter in the context of pinching, the present invention is not limited to manual manipulation of the attachment legs by pinching.

Attaching the hanger 10 to the support structure 14 is completed by inserting the attachment legs 15 together into the installation opening 20 while the attachment legs are pinched together. The stabilizers 46 are oriented toward the outer surface 48 of the support structure 14 while the hanger 10 is attached to the support structure. Preferably, the stabilizers 46 or the leading ends of the strengthening ridges 44 firmly abut the outer surface 48 of the support structure 14 and the barbs 42 of the attachment legs 15 firmly abut the inner surface 50 of the support structure while the hanger 10 is attached to the support structure.

FIG. 2 schematically illustrates the hanger 10 attached to the support structure 14 generally as described above. More specifically, the wall of the support structure 14 that defines the installation opening 20 is schematically illustrated by dashed lines and the attachment legs 15 are extending through the installation opening in FIG. 2. Likewise, the cable 12 is schematically illustrated by dashed lines as being within the longitudinal passageway 26 in FIG. 2. The cable 12 is removed from the support structure 14 and hanger 10 by performing the foregoing operations in reverse order, although it may be preferred to use a pair of pliers, or the like, to pinch the attachment legs 15 together for removal purposes.

As the attachment legs 15 are pinched together in the furtherance of attaching the hanger 12 to the support structure 14, the lateral passageway 30 is partially closed and the gripping tabs 24 biasingly engage the outer jacket, or the like, of the cable 12 within the longitudinal passageway 26. More specifically and advantageously, the gripping tabs 24 interact with the cable 12 such that the gripping tabs function as cantilever springs and the intermediate bands 22 function as twisting torsion springs while the hanger 10 holds the cable and is mounted to the support structure 14 in the manner described above. Accordingly, the gripping tabs 24 can be characterized as cantilever springs and the intermediate bands 22 can be characterized as torsion springs. The intermediate bands 22 can more specifically be characterized as torsion bars, although other types of torsion springs are also within the scope of the present invention.

Regarding the torsion springs more specifically, the gripping tabs 24 respectively extend from the intermediate bands 22 (i.e., torsion springs) to grippingly engage the surface of a cable 12 within the longitudinal passageway 26. For each intermediate band 22, when its associated gripping tab 24 grippingly engages the cable 12 within the longitudinal passageway 26, the intermediate band twists about its elongate axis to function as a torsion spring. The gripping tabs 24 can be replaced with other types of gripping projections for grippingly engaging a cable 12 within the longitudinal passageway 26 and causing the intermediate bands 22 to twist about their elongate axes to function as torsion springs. Additionally, whereas in accordance with the exemplary embodiment the gripping tabs 24 can be characterized as both radial portions of torsion springs and cantilever springs, in accordance with an alternative embodiment of the present invention the gripping tabs function substantially solely as radial portions of torsion springs, and not as cantilever springs.

The openings specifically characterized herein as the outer and intermediate slots 38 and 34 advantageously allow for the independent resilient deflection of the gripping tabs 24 and intermediate bands 22 that allows these elements to optimally function as spring elements. Stated differently, the outer and intermediate slots 38 and 34 define the intermediate bands 22 and gripping tabs 24 to advantageously provide the spring-like functionality of the present invention. Regarding this functionality more specifically, the solid-lined illustrations of the hanger 10 in FIGS. 1–4 are illustrative of the hanger being in a free or relaxed state, in which the hanger is separated from the cable 12 and support structure 14. In the relaxed state, the maximum distance between the outer surfaces of the attachment legs 15 is wider than the widest point of the installation opening 20. In contrast, the dotted lines in FIGS. 3–4 respectively schematically illustrate the gripping tabs 24 and intermediate bands 22 in deflected configurations that exaggerate but are representative of their deflected configurations while the hanger 10 holds the cable 12 and is attached to the support structure 14 as described above. More specifically, the dotted lines in FIG. 3 schematically illustrate the gripping tabs 24 functioning as cantilever springs, and the dotted lines in FIG. 4 schematically illustrate the torsional deflection of the intermediate bands 22 functioning as torsion springs.

The combined cantilever and torsion spring aspect of the present invention offers many advantages. For example, the hanger 10 can be easily used and is fully functional with cables of slightly different diameters and shapes and mounting holes of slightly different diameters. Additionally, the combined cantilever and torsion spring aspect can be characterized as a spring system with a predetermined spring rate selected so that it is not necessary to apply too much force to the attachment legs 15 while attaching or detaching the hanger, so that the attachment legs can preferably be manually squeezed together by the user during installation or removal, and so that an optimal amount of spring energy is provided for gripping the cable 12 and keeping the hanger 10 attached to the support structure 14 after installation.

The gripping of the cable 12 by the cable holding section 16 is enhanced by the generally cone-like gripping protrusions 21. In accordance with the exemplary embodiment, the tips of the gripping protrusion 21 penetrate slightly into the outer jacket of the cable 12, with the penetration being limited, if necessary, by the broad surface areas that extend around the bases of the gripping protrusions. Additionally, the tips of the gripping protrusions 21 are preferably slightly rounded to limit the penetration of the gripping protrusions into the cable 12.

The gripping protrusions 21 of the gripping tabs 24 are capable of readily moving into or out of the longitudinal passageway 26 by virtue of the spring-like characteristics of the intermediate bands 22 and gripping tabs 24. In accordance with this exemplary embodiment, this motion of the gripping protrusions 21 associated with the gripping tabs 24 advantageously provides the variation in the clamping function of the cable holding section 16 that compensates for variations in cables 12 and installation openings 20.

In accordance with an alternative embodiment of the present invention, the gripping protrusions 21 are not required. In accordance with one example of this alternative embodiment, the gripping tabs 24 are bent so that the free ends of the gripping tabs extend into the longitudinal passageway 26 while the hanger 10 is in its relaxed state, and the free ends of the gripping tabs engage the cable 12 while the cable is within the longitudinal passageway and the hanger is attached to the support structure 14 in a manner generally like that specified above, so that the hanger functions generally as described above.

In accordance with the exemplary embodiment, the outer bands 36 advantageously protect the intermediate bands 22 from damage. In accordance with the exemplary embodiment, the outer bands 36 also serve as relatively rigid structures that can be manually pressed against while installing the hanger 10, and they also aid in keeping the stabilizers 46 aligned, which helps to keep the hanger from cocking from side to side during installation. In accordance with an alternative embodiment of the present invention, a hanger is identical to the hanger 10 of the exemplary embodiment, except that it does not include the outer bands 36 or stabilizers 46.

In accordance with the exemplary embodiment, the hanger 10 is manufactured by cutting an appropriate piece from a flat sheet of metal, and then bending the piece accordingly. The thickness of the piece of metal and the amount of material removed to form the intermediate and outer slots 34 and 38 are selected so that the resulting lengths and widths of the intermediate bands 22 and gripping tabs 24 allow them to respectively function as torsion and cantilever springs. In accordance with the exemplary embodiment, the circumferential length of each intermediate band 22 is at least approximately ten times the narrowest width of the intermediate band, with the width measured in the longitudinal direction. In accordance with the exemplary embodiment, the hanger 10 is unitary, meaning that it is absent of originally separate parts that have been joined. The hanger 10 can also be constructed through the use of other materials and manufacturing techniques. For example, in accordance with another embodiment of the present invention, the hanger 10 is molded from polymeric material (e.g., plastic).

In accordance with the exemplary embodiment, the cable 12 is a conventional coaxial cable that is at least generally circular in an end elevation view, although other types and shapes of cables are within the scope of the present invention. Similarly and in accordance the exemplary embodiment, the support structure 14 and installation opening 20 are conventional. Other types of support structures and combinations of support structures for receiving the attachment legs 15 are within the scope of the present invention. More specifically and in accordance with one example, multiple of the hangers 10 are used to secure a section of cable 12 that extends from a conventional communications facility (not shown) that is on the ground to a conventional communications antenna (not shown) mounted at the top of a conventional tower (not shown). Multiple of the hangers 10 that hold the cable 12 are mounted to the tower and are spaced apart along the height of the tower. More specifically, multiple of the support structures 14 are mounted to the tower and are spaced apart along the height of the tower, each support structure receives a hanger 10, and each hanger holds a section of the cable 12 that extends along the height of the tower. The tower itself may be characterized as a support structure, as it can itself define the installation openings 20 such that support structures 14 separate from the tower are not required. Alternatively, support structures 14 attached to the tower can be characterized as being portions of the tower.

In accordance with a more specific example, hangers 10 of the present invention are used in place of the hangers disclosed in U.S. Pat. No. 5,393,021, to hold and support a cable extending from a communications facility that is on the ground to a communications antenna mounted at the top of a tower.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hanger for mounting a cable to a support structure, the hanger including a flexible resilient strip shaped to form a cable holding section defining a longitudinally extending passageway for receiving and at least partially surrounding the cable, and the cable holding section including a slot extending at least partially around the circumferential extent of the passageway and defining in the cable holding section along at least one side of the slot a torsion spring extending at least partially around the passageway and capable of torsional deflection, and at least one gripping projection projecting from the torsion spring and oriented for grippingly engaging the surface of a cable placed in the passageway.

2. A hanger as defined in claim 1, wherein the strip has attachment legs formed at opposite ends thereof configured for being inserted into an installation opening on a support structure, the strip has a medial portion between the attachment legs, and the medial portion is shaped to form the cable holding section.

3. A hanger as defined in claim 2, wherein the slot extends around at least about one-half the circumferential extent of the passageway, and the gripping projection is a gripping tab that projects laterally into the slot.

4. A hanger as defined in claim 3, wherein the cable holding section of the strip has opposed opposite edges extending at least partially around the passageway, and said slot extends between and generally parallel to the opposed opposite edges.

5. A hanger as defined in claim 4, including an additional slot formed in the cable holding section and extending at least partially around the circumferential extent of the passageway and defining in the cable holding section an additional torsion spring extending at least partially around the passageway and capable of torsional deflection, and at least one cantilevered gripping tab projecting from said additional torsion spring.

6. A hanger as defined in claim 2, wherein the gripping projection is a gripping tab including a gripping protrusion formed in the gripping tab and facing inwardly toward the passageway for gripping the surface of a cable.

7. A hanger as defined in claim 6, including at least one additional gripping protrusion formed on the cable holding section at a location spaced from the gripping tab for gripping another portion of the surface of the cable.

8. A hanger as defined in claim 1, wherein the slot extends at least half way around the circumferential extent of the passageway.

9. A hanger for mounting a cable to a support structure, the hanger including a flexible resilient strip, the strip having attachment legs formed at opposite ends thereof configured for being inserted into an installation opening on a support structure, and the strip having a medial portion between the attachment legs shaped to form a cable holding section defining a longitudinally extending passageway for receiving and at least partially surrounding the cable, and the cable holding section including a first circumferentially extending slot formed in the cable holding section and extending at least partially around the circumferential extent of the passageway, and a pair of second circumferentially extending slots formed in the cable holding section on opposite sides of said first slot, the first slot and the pair of second slots defining in the cable holding section along opposite sides of the first slot a pair of torsion springs extending at least partially around the passageway and capable of torsional deflection, and at least one gripping projection projecting from each torsion spring and oriented for grippingly engaging the surface of a cable placed in the passageway.

10. A hanger as defined in claim 9, wherein the cable holding section of the metallic strip has opposed opposite edges extending at least partially around the passageway, and said slots extend between and generally parallel to the opposed opposite edges, and the cable holding section includes a pair of bands extending circumferentially at least partially around the passageway.

11. A hanger as defined in claim 9, wherein each gripping projection is a cantilevered gripping tab that includes a gripping protrusion formed therein and facing inwardly toward the passageway for gripping the surface of a cable.

12. A hanger as defined in claim 11, including at least one additional gripping protrusion formed on the cable holding section at a location spaced from the gripping tabs for gripping another portion of the surface of the cable.

13. A hanger as defined in claim 9, wherein the first slot and the pair of second slots each extend at least half way around the circumferential extent of the passageway.

14. A hanger as defined in claim 9, wherein said first slot is of substantially uniform width along its extent, and wherein each of said second slots include respective reduced width portions defining the gripping projections in the form of cantilevered gripping tabs projecting laterally into the respective second slots.

15. A hanger for mounting a cable to a support structure, the hanger including a flexible resilient unitary strip, the strip having a medial portion shaped in a generally circular configuration about a longitudinal axis to form a cable holding section defining a longitudinally extending passageway for receiving and at least partially surrounding the cable, and the strip having attachment legs extending from opposite ends of the medial portion in opposing spaced apart relation to one another generally perpendicular to said longitudinal axis and configured for being inserted into an installation opening on a support structure, and the cable holding section including a first circumferentially extending slot extending at least partially around the circumferential extent of the passageway, and a pair of second circumferentially extending slots formed in the cable holding section on opposite sides of said first slot, the first slot and the pair of second slots defining in the cable holding section along opposite sides of the first slot a pair of torsion springs extending at least partially around the passageway and capable of torsional deflection, and a pair of bands adjacent said second slots, said bands extending circumferentially at least partially around the passageway, at least one cantilevered gripping tab projecting from each torsion spring laterally into the adjoining second slot and oriented for grippingly engaging the surface of a cable placed in the passageway, and a gripping protrusion formed in each gripping tab and facing inwardly toward the passageway for gripping the surface of a cable placed in the passageway.

16. A hanger as defined in claim 15, wherein the first slot and the pair of second slots each extend at least half way around the circumferential extend of the passageway.

* * * * *